United States Patent
Mangette et al.

(10) Patent No.: US 11,008,037 B2
(45) Date of Patent: May 18, 2021

(54) MODEL BASED DIAGNOSTICS BASED ON STEERING MODEL

(71) Applicant: Crown Equipment Corporation, New Bremen, OH (US)

(72) Inventors: Stephen T. Mangette, Delphos, OH (US); Brent A. Barnhart, Van Wert, OH (US)

(73) Assignee: Crown Equipment Corporation, New Bremen, OH (US)

( * ) Notice: Subject to any disclaimer, the term of this patent is extended or adjusted under 35 U.S.C. 154(b) by 672 days.

(21) Appl. No.: 15/224,945

(22) Filed: Aug. 1, 2016

(65) Prior Publication Data

US 2017/0043804 A1   Feb. 16, 2017

Related U.S. Application Data

(60) Provisional application No. 62/205,103, filed on Aug. 14, 2015.

(51) Int. Cl.
*B62D 5/04*     (2006.01)
*B62D 15/02*    (2006.01)
(Continued)

(52) U.S. Cl.
CPC ......... *B62D 5/0481* (2013.01); *B62D 5/0487* (2013.01); *B62D 6/002* (2013.01); *B62D 15/021* (2013.01); *B66F 9/07568* (2013.01)

(58) Field of Classification Search
CPC .... B62D 5/0481; B62D 5/0487; B62D 6/002; B62D 15/021; B66F 9/07568; B60W 10/20; B60W 50/0205; B60W 2540/18
See application file for complete search history.

(56) References Cited

U.S. PATENT DOCUMENTS 4,595,433 A   6/1986   Ford et al.
4,600,071 A   7/1986   Kitahara et al.
(Continued)

FOREIGN PATENT DOCUMENTS

CN   1695974 A    11/2005
CN   101186207 A   5/2008
(Continued)

OTHER PUBLICATIONS

U.S. Appl. No. 62/445,889; entitled "Traction Speed Recovery Based on Steer Wheel Dynamic," filed Jan. 13, 2017 by Stephen T. Mangette.
(Continued)

*Primary Examiner* — Christian Chace
*Assistant Examiner* — Michael F Whalen
(74) *Attorney, Agent, or Firm* — Stevens & Showalter LLP (57) ABSTRACT

A steering application executing on a vehicle control module receives a steering control input to control a steered wheel of a vehicle and, based on the steering control input, determines a setpoint value for the steered wheel. A diagnostic supervisor receives a measured value of the control attribute and the setpoint value; wherein the first diagnostic supervisor comprises a first model of a steering system of the vehicle. Based on the setpoint value and the first model, the diagnostic supervisor calculates a virtual value of the control attribute and, based on the virtual value and the measured value of the control attribute the first diagnostic supervisor determines an operating condition of the steering system of the vehicle.

24 Claims, 5 Drawing Sheets

(51) Int. Cl.
  *B62D 6/00* (2006.01)
  *B66F 9/075* (2006.01)

(56) References Cited

U.S. PATENT DOCUMENTS

| | | |
|---|---|---|
| 4,762,194 A | 8/1988 | Morishita et al. |
| 4,942,529 A | 7/1990 | Avitan et al. |
| 5,258,914 A | 11/1993 | Schmitt |
| 5,436,836 A | 7/1995 | Holtz et al. |
| 5,850,616 A | 12/1998 | Matsuno et al. |
| 6,799,652 B2 | 10/2004 | Nissen et al. |
| 6,807,471 B2 | 10/2004 | Fujimori |
| 6,971,470 B2 | 12/2005 | McGoldrick |
| 7,017,689 B2 | 3/2006 | Gilliland et al. |
| 7,023,174 B2 | 4/2006 | Fromme et al. |
| 7,025,157 B2 | 4/2006 | Lindsay et al. |
| 7,165,643 B2 | 1/2007 | Bozem et al. |
| 7,278,509 B2 | 10/2007 | Schröder et al. |
| 7,568,547 B2 | 8/2009 | Yamada et al. |
| 7,599,776 B2 | 10/2009 | Sonderegger et al. |
| 7,661,493 B2 | 2/2010 | Rose |
| 7,665,555 B2 | 2/2010 | Rose et al. |
| 7,706,947 B2 | 4/2010 | Bozem et al. |
| 7,784,880 B2 | 8/2010 | Glaeske et al. |
| 7,849,955 B2 | 12/2010 | Crabill et al. |
| 7,979,189 B2 | 7/2011 | Nihei |
| 7,980,352 B2 | 7/2011 | Wetterer et al. |
| 8,140,228 B2 | 3/2012 | McCabe et al. |
| 8,172,033 B2 | 5/2012 | Corbett et al. |
| 8,230,976 B2 | 7/2012 | Baldini |
| 8,235,161 B2 | 8/2012 | Passed et al. |
| 8,395,491 B2 | 3/2013 | Kümmel et al. |
| 8,412,431 B2 | 4/2013 | Wetterer et al. |
| 8,452,464 B2 | 5/2013 | Castaneda et al. |
| 8,463,511 B2 | 6/2013 | Uematsu et al. |
| 8,521,384 B2 | 8/2013 | O'Connor et al. |
| 8,634,986 B2 | 1/2014 | Ghoneim |
| 8,649,953 B2 | 2/2014 | Sherman |
| 8,694,194 B2 | 4/2014 | Waltz et al. |
| 8,718,890 B2 | 5/2014 | Wetterer et al. |
| 8,731,785 B2 | 5/2014 | McCabe et al. |
| 8,788,156 B2 | 7/2014 | Nishimura |
| 8,886,378 B2 | 11/2014 | Hammer et al. |
| 8,892,294 B2 | 11/2014 | Waltz et al. |
| 8,918,263 B2 | 12/2014 | Zent et al. |
| 9,082,293 B2 | 7/2015 | Wellman et al. |
| 9,184,690 B2 | 11/2015 | Kashima et al. |
| 9,421,963 B2 | 8/2016 | Wetterer et al. |
| 9,868,445 B2 | 1/2018 | Mangette et al. |
| 10,414,288 B2* | 9/2019 | Mangette ............ B60W 10/08 |
| 2003/0079932 A1 | 5/2003 | Ono et al. |
| 2003/0114970 A1 | 6/2003 | Hara |
| 2003/0169003 A1* | 9/2003 | Cao .................. B62D 5/092 |
| | | 318/432 |
| 2005/0027427 A1 | 2/2005 | Nagaya et al. |
| 2005/0049769 A1 | 3/2005 | Tsuchiya |
| 2005/0072621 A1* | 4/2005 | Hara .................. B62D 1/163 |
| | | 180/444 |
| 2005/0162114 A1 | 7/2005 | Makaran |
| 2006/0052927 A1 | 3/2006 | Watanabe et al. |
| 2006/0065470 A1 | 3/2006 | Manken et al. |
| 2006/0102397 A1 | 5/2006 | Buck et al. |
| 2006/0211535 A1 | 9/2006 | Casey |
| 2007/0007080 A1 | 1/2007 | Manthey et al. |
| 2007/0175693 A1 | 8/2007 | Krimbacher |
| 2007/0212680 A1* | 9/2007 | Friedrichs .......... G01N 33/5005 |
| | | 435/4 |
| 2007/0225885 A1* | 9/2007 | Hara .................. B62D 5/049 |
| | | 701/43 |
| 2007/0295545 A1* | 12/2007 | Romig ................ B60W 10/08 |
| | | 180/197 |
| 2009/0194358 A1 | 8/2009 | Corbett et al. |
| 2009/0204292 A1 | 8/2009 | Tate et al. |
| 2009/0222156 A1 | 9/2009 | Krueger et al. |
| 2009/0314568 A1 | 12/2009 | Brown et al. |
| 2010/0025144 A1 | 2/2010 | Huang et al. |
| 2011/0251762 A1 | 10/2011 | Uematsu et al. |
| 2012/0123614 A1 | 5/2012 | Laws et al. |
| 2012/0136539 A1 | 5/2012 | Bryant et al. |
| 2013/0138290 A1 | 5/2013 | Falkenstein |
| 2013/0226411 A1 | 8/2013 | Hirano et al. |
| 2013/0338886 A1 | 12/2013 | Callea et al. |
| 2014/0143607 A1* | 5/2014 | Vogt .................. G06F 11/079 |
| | | 714/43 |
| 2014/0163804 A1 | 6/2014 | Kaneko et al. |
| 2014/0188324 A1 | 7/2014 | Waltz et al. |
| 2014/0195127 A1 | 7/2014 | Hoffman |
| 2014/0277871 A1 | 9/2014 | Goncalves et al. |
| 2014/0277985 A1 | 9/2014 | Zent et al. |
| 2014/0278021 A1 | 9/2014 | Fackler et al. |
| 2015/0032423 A1 | 1/2015 | Tang |
| 2015/0090507 A1 | 4/2015 | Okada et al. |
| 2015/0096826 A1 | 4/2015 | Eden et al. |
| 2015/0158522 A1 | 6/2015 | Thayer |
| 2015/0274196 A1 | 10/2015 | Park et al. |
| 2015/0291155 A1* | 10/2015 | Jonsson ............ B60T 8/17551 |
| | | 701/70 |
| 2015/0331061 A1 | 11/2015 | Hirschbold et al. |
| 2015/0375780 A1* | 12/2015 | Chai .................. B62D 6/008 |
| | | 701/41 |
| 2016/0016482 A1 | 1/2016 | Lee |
| 2016/0129803 A1 | 5/2016 | Grewal et al. |
| 2016/0160470 A1 | 6/2016 | Kishimoto et al. |
| 2016/0264387 A1 | 9/2016 | Yoon et al. |
| 2016/0272081 A1 | 9/2016 | Lee |
| 2016/0289056 A1 | 10/2016 | Castaneda et al. |
| 2017/0001663 A1* | 1/2017 | Moberg ................ B62D 6/04 |
| 2017/0015330 A1 | 1/2017 | Armbruster et al. |
| 2017/0028993 A1 | 2/2017 | Addison et al. |
| 2017/0028994 A1 | 2/2017 | Addison et al. |
| 2017/0029023 A1 | 2/2017 | Otterbein |
| 2017/0043787 A1* | 2/2017 | Mangette .......... B60W 50/0205 |
| 2018/0134310 A1* | 5/2018 | Benak ................ B62D 5/0481 |
| 2018/0141553 A1 | 5/2018 | Katayama et al. |
| 2019/0100236 A1* | 4/2019 | De Carteret ........ B62D 5/0481 |

FOREIGN PATENT DOCUMENTS

| | | |
|---|---|---|
| CN | 101423054 A | 5/2009 |
| CN | 101548593 A | 10/2009 |
| CN | 101565043 A | 10/2009 |
| CN | 101746412 A | 6/2010 |
| CN | 101977837 A | 2/2011 |
| CN | 102171078 A | 8/2011 |
| CN | 102171083 A | 8/2011 |
| CN | 102218988 A | 10/2011 |
| CN | 102239455 A | 11/2011 |
| CN | 102442222 A | 5/2012 |
| CN | 102549514 A | 7/2012 |
| CN | 102582678 A | 7/2012 |
| CN | 103991824 A | 8/2014 |
| CN | 104044637 A | 9/2014 |
| CN | 104627235 A | 5/2015 |
| CN | 105555642 A | 5/2016 |
| CN | 106143263 A | 11/2016 |
| CN | 106170430 A | 11/2016 |
| DE | 4311485 A1 | 10/1994 |
| DE | 19702313 C1 | 4/1998 |
| DE | 10114600 A1 | 1/2002 |
| DE | 10204955 A1 | 8/2002 |
| DE | 10205632 A1 | 10/2002 |
| DE | 10204742 A1 | 7/2003 |
| DE | 10301435 A1 | 12/2003 |
| DE | 10358907 A1 | 7/2004 |
| DE | 102004001318 A1 | 8/2004 |
| DE | 10354663 A1 | 6/2005 |
| DE | 102004028828 A1 | 1/2006 |
| DE | 102005022089 A1 | 11/2006 |
| DE | 102006035863 A1 | 2/2008 |
| DE | 102006041254 A1 | 3/2008 |
| DE | 102006050506 A1 | 4/2008 |
| DE | 102008012007 A1 | 9/2009 |
| DE | 102010007615 A1 | 9/2010 |
| DE | 102009020157 A1 | 11/2010 |

(56) References Cited

FOREIGN PATENT DOCUMENTS

| | | |
|---|---|---|
| DE | 112009004544 T5 | 8/2012 |
| DE | 102011013248 A1 | 9/2012 |
| DE | 102012102459 A1 | 9/2013 |
| DE | 102012209788 A1 | 12/2013 |
| DE | 102013011883 A1 | 1/2015 |
| DE | 10355933 B4 | 4/2015 |
| EP | 0436567 B1 | 10/1992 |
| EP | 1089901 B1 | 1/2002 |
| EP | 1186459 A1 | 3/2002 |
| EP | 1281600 A2 | 2/2003 |
| EP | 1183579 B1 | 10/2004 |
| EP | 1607309 A2 | 12/2005 |
| EP | 1301387 B1 | 3/2006 |
| EP | 0930216 B1 | 7/2006 |
| EP | 1268257 B1 | 7/2006 |
| EP | 1360103 B1 | 8/2006 |
| EP | 1741615 A1 | 1/2007 |
| EP | 1325857 B1 | 5/2007 |
| EP | 1527980 B1 | 12/2009 |
| EP | 2218627 A1 | 8/2010 |
| EP | 1880919 B1 | 5/2011 |
| EP | 1594026 B1 | 7/2011 |
| EP | 2145812 B1 | 11/2011 |
| EP | 1399344 B1 | 8/2012 |
| EP | 2164746 B1 | 8/2012 |
| EP | 2508403 A1 | 10/2012 |
| EP | 2404803 A1 | 11/2012 |
| EP | 2172359 B1 | 12/2012 |
| EP | 2551161 A2 | 1/2013 |
| EP | 2368785 B1 | 9/2013 |
| EP | 2483130 B1 | 11/2013 |
| EP | 2664515 A1 | 11/2013 |
| EP | 2674387 A1 | 12/2013 |
| EP | 2582564 B1 | 2/2014 |
| EP | 2374692 B1 | 3/2014 |
| EP | 2630023 B1 | 5/2014 |
| EP | 2613986 B1 | 8/2016 |
| EP | 3078574 A1 | 10/2016 |
| FR | 2862594 A1 | 5/2005 |
| GB | 2042217 A | 9/1980 |
| GB | 2125577 A | 3/1984 |
| GB | 2370819 A | 12/2001 |
| GB | 2391848 A | 2/2004 |
| GB | 2413547 B | 6/2007 |
| GB | 2433791 A | 7/2007 |
| GB | 2425996 B | 1/2009 |
| GB | 2486177 A | 6/2012 |
| GB | 2523462 A | 8/2015 |
| JP | 11310399 A | 11/1999 |
| JP | 2000142065 A | 5/2000 |
| JP | 2003306160 A | 10/2003 |
| JP | 2005253143 A | 9/2005 |
| JP | 2010058677 A | 3/2010 |
| JP | 2010095354 A | 4/2010 |
| JP | 2010195118 A | 9/2010 |
| JP | 2012254705 A | 12/2012 |
| JP | 2013126868 A | 6/2013 |
| JP | 5418705 B2 | 2/2014 |
| JP | 2014221591 A | 11/2014 |
| KR | 100225961 B1 | 10/1999 |
| KR | 2015004511 A | 1/2015 |
| WO | 200202389 A1 | 1/2002 |
| WO | 2004098941 A1 | 11/2004 |
| WO | 2011027758 A1 | 3/2011 |
| WO | 2012032133 A1 | 3/2012 |
| WO | 2013006742 A1 | 1/2013 |
| WO | 2013033179 A1 | 3/2013 |
| WO | 2014189877 A1 | 11/2014 |
| WO | 2015152276 A1 | 10/2015 |
| WO | 2015178843 A1 | 11/2015 |
| WO | 2015178845 A1 | 11/2015 |
| WO | 2017030774 A1 | 2/2017 |
| WO | 2017030879 A1 | 2/2017 |

OTHER PUBLICATIONS

U.S. Appl. No. 62/445,902; entitled "High Speed Straight Ahead Tiller Desensitization," filed Jan. 13, 2017 by Stephen Mangette.

Ryan J. Rink; Final Office Action; U.S. Appl. No. 15/234,120; dated Mar. 28, 2018; United States Patent and Trademark Office; Alexandria, Virginia.

Ryan J. Rink; Notice of Allowance and Fees Due; U.S. Appl. No. 15/234,168; dated Mar. 29, 2018; United States Patent and Trademark Office; Alexandria, Virginia.

Paul Pemberton; International Search Report and Written Opinion; International application No. PCT/US2017/060990; dated Mar. 29, 2018; European Patent Office; Rijswijk, Netherlands.

Ryan J. Rink; Corrected Notice of Allowability; U.S. Appl. No. 15/234,168; dated Apr. 19, 2018; United States Patent and Trademark Office; Alexandria, Virginia.

Bendidi, Rachid; Notice of Allowance; U.S. Appl. No. 15/234,152; dated Aug. 31, 2017; United States Patent and Trademark Office; Alexandria, VA.

Luzcando, Gissele; EIC 3600 Search Report; U.S. Appl. No. 15/234,152; dated Aug. 8, 2017; STIC Scientific & Technical Information Center; United States Patent and Trademark Office; Alexandria, VA.

Song, Dafeng et al.; "Software-in-the-loop simulation of traction control system"; Nongye Jixie Xuebao (Transactions of the Chinese Society of Agricultural Machinery) 36.8; Aug. 2005; pp. 27-29—Reference is from EIC 3600 Search Report.

Matveev, Alexey S.; "Nonlinear sliding mode control of an unmanned agricultural tractor in the presence of sliding and control saturation"; Robotics and Autonomous Systems; Sep. 2013; pp. 973-987—Reference is from EIC 3600 Search Report.

Keen, Alex et al.; "Improvements to the tractive efficiency of agricultural tractors carrying out cultivations"; American Society of Agricultural and Biological Engineers Annual International Meeting 2009; 7; pp. 4669-4682—Reference is from EIC 3600 Search Report.

Bruce Sheppard; International Search Report and Written Opinion; International Application No. PCT/US2017/060988; dated GFeb. 26, 2018; European Patent Office; Rijswijk, Netherlands.

Athina Nickitas-Etienne; International Preliminary Report on Patentability; International Application No. PCT/US2016/044981; dated Feb. 20, 2018; International Bureau of WIPO; Geneva, Switzerland.

Mineko Mohri; International Preliminary Report on Patentability; International Application No. PCT/US2016/046456; dated Feb. 20, 2018; International Bureau of WIPO; Geneva, Switzerland.

Mineko Mohri; International Preliminary Report on Patentability; International Application No. PCT/US2016/046460; dated Feb. 20, 2018; International Bureau of WIPO; Geneva, Switzerland.

Simin Baharlou; International Preliminary Report on Patentability; International Application No. PCT/US2016/046466; dated Feb. 20, 2018; International Bureau of WIPO; Geneva, Switzerland.

Rink, Ryan J.; Office Action; U.S. Appl. No. 15/234,168, dated Nov. 22, 2017; united States Patent and Trademark Office; Alexandria, VA.

Ryan J. Rink; Office Action; U.S. Appl. No. 15/234,120; dated Nov. 1, 2017; United States Patent and Trademark Office; Alexandria, Virginia.

U.S. Appl. No. 15/808,949; entitled "Traction Speed Recovery Based on Steer Wheel Dynamic;" filed Nov. 10, 2017 by Stephen Mangette.

U.S. Appl. No. 15/808,962; entitled "High Speed Straight Ahead Tiller Desensitization;" filed Nov. 10, 2017 by Stephen Mangette.

Janusch, Stefan; International Search Report and Written Opinion; International Application No. PCT/US2016/044981; dated Nov. 9, 2016; European Patent Office; Rijswijk, Netherlands.

Plenk, Rupert; International Search Report and Written Opinion; International Application No. PCT/US2016/046456; dated Nov. 25, 2016; European Patent Office; Rijswijk, Netherlands.

Plenk, Rupert; International Search Report and Written Opinion; International Application No. PCT/US2016/046460; dated Nov. 25, 2016; European Patent Office; Rijswijk, Netherlands.

Plenk, Rupert; International Search Report and Written Opinion; International Application No. PCT/US2016/046466; dated Nov. 25, 2016; European Patent Office; Rijswijk, Netherlands.

(56) References Cited

OTHER PUBLICATIONS

Stephen Mangette, Joe Hammer and Brent Barnhart; Specification and Drawings; U.S. Appl. No. 15/234,120, filed Aug. 11, 2016.
Stephen Mangette, Joe Hammer and Brent Barnhart; Specification and Drawings; U.S. Appl. No. 15/234,152, filed Aug. 11, 2016.
Stephen Mangette, Joe Hammer and Brent Barnhart; Specification and Drawings; U.S. Appl. No. 15/234,168, filed Aug. 11, 2016.
Rink, Ryan J.; Final Office Action; U.S. Appl. No. 15/234,120; dated Dec. 28, 2018; United States Patent and Trademark Office, Alexandria, VA.
Rink, Ryan J.; Office Action; U.S. Appl. No. 15/234,120; dated Jul. 20, 2018; United States Patent and Trademark Office, Alexandria, VA.
Kan, Yuri, Office Action; U.S. Appl. No. 15/808,949; dated Jan. 14, 2019; United States Patent and Trademark Office, Alexandria, VA.
Zhu Qixiao; First Office Action; Chinese Application No. 201680045420.9, dated Oct. 28, 2019; China National Intellectual Property Administration; Beijing, China.
Kan, Yuri; Notice of Allowance; U.S. Appl. No. 15/808,962; dated Mar. 13, 2020; U.S. Patent and Trademark Office; Alexandria, Virginia.
Liu Baojun; First Office Action; Chinese Application No. 201680047909; dated Oct. 31, 2019; State Intellectual Property Office of the People's Republic of China.
Liu Baojun; First Office Action; Chinese Application No. 201680047910.2; dated Nov. 1, 2019; China National Intellectual Property Administration; Beijing, China.
Liu Baojun; First Office Action; Chinese Application No. 201680047915.5; dated Nov. 5, 2019; China National Intellectial Property Administration; Beijing, China.
Australian Examination Report No. 1; Australian Application No. 2016309710; dated Feb. 21, 2020; IP Australia.
Kan, Yuri; Non-final Office Action; U.S. Appl. No. 15/808,962; dated Dec. 13, 2019; United States Patent and Trademark Office; Alexandria, Virginia.
Wayne O'Connell, Examination Report No. 1; Australian Application No. 2016309784; dated Mar. 31, 2020; IP Australia.
Office Action and Search Report; Chinese Patent Application No. 201780071814.6; dated Apr. 26, 2020; China National Intellectual Property Office; Beijing, China.
Yew-Seng How; Examination Report No. 1; Australian Patent Application No. 2016309788; dated Apr. 28, 2020; Australian Patent Office; Phillip ACT, Australia.
Yew-Seng How; Examination Report No. 1; Australian Patent Application No. 2016309785; dated Apr. 29, 2020; Australian Patent Office; Phillip ACT, Australia.
Stephen Mangette; "High Speed Straight Ahead Tiller Desensitization"; U.S. Appl. No. 16/872,756, filed May 12, 2020.
Notification of First Office Action dated Jan. 8, 2021; Chinese Application No. 201780073467.0 (CRN 902 PF); China National Intellectual Property Administration; Beijing, China.

* cited by examiner

MODEL BASED DIAGNOSTICS BASED ON STEERING MODEL

CROSS REFERENCE TO RELATED APPLICATION

The application claims the benefit of U.S. Provisional Patent Application Ser. No. 62/205,103, filed Aug. 14, 2015, entitled "Model Based Diagnostics Based on Steering Model," which is hereby incorporated by reference herein in its entirety.

FIELD OF THE INVENTION

The present invention relates generally to diagnostics of a materials handling vehicle, and, more particularly, to utilizing a steering model to perform diagnostics.

BACKGROUND OF THE INVENTION

Forklifts and other types of industrial vehicles are expected to operate under a variety of different conditions. Further, such vehicles typically include a number of different functional systems such as a traction system to control a travelling speed of the vehicle and a steering system to control a direction in which the vehicle travels.

For diagnostic purposes, it may be beneficial to monitor different attributes of one or more of the different functional systems while the vehicle is being operated.

BRIEF SUMMARY OF THE INVENTION

One aspect of the present invention relates to a method that includes receiving, by a steering application executing on a vehicle control module, a steering control input to control a steered wheel of a vehicle and, based on the steering control input, determining, by the steering application, a setpoint value of a control attribute related to the steered wheel. The method also includes receiving, by a first diagnostic supervisor a) a measured value of the control attribute, from a steering control module, and b) the setpoint value of the control attribute, from the steering application; wherein the first diagnostic supervisor comprises a first model of a steering system of the vehicle. Based on the setpoint value and the first model, the first diagnostic supervisor calculates a first virtual value of the control attribute and, based on the first virtual value of the control attribute and the measured value of the control attribute, the first diagnostic supervisor determines a first operating condition of the steering system of the vehicle.

In accordance with another aspect of the present invention the control attribute comprises a steered wheel angle or an angular velocity of a steering motor coupled with the steered wheel of the vehicle. Also, the steering application and the first diagnostic supervisor can execute on a first controller and the steering application may communicate the setpoint value to the steering control module; wherein the steering control module controls a steering motor coupled with the steered wheel based on the setpoint value.

In accordance with another aspect of the invention, determining the first operating condition of the steering system may be performed by comparing the first virtual value of the controlled attribute with the measured value to determine an indicator that represents a degree of similarity between the first virtual value and the measured value. In particular, the first virtual value may be a first array of individually valued elements; the measured value may be a second array of individually valued elements; and the indicator is determined based on a computed correlation between the first array and the second array.

In accordance with another aspect of the present invention, the indicator can be compared to a predetermined threshold value; and based on the comparison, a determination is made whether or not the steering system is in a fault condition. Furthermore, the vehicle control module may stop movement of the vehicle when the steering system is in the fault condition.

In accordance with yet another aspect of the present invention, the first model of the steering system comprises a transfer function calculated based on observed responses of a substantially similar steering system to a plurality of different operating conditions.

In accordance with another aspect of the present invention, the method includes receiving, by a second diagnostic supervisor a) the measured value of the control attribute, from the steering control module, and b) the setpoint value of the control attribute, from the steering application; wherein the second diagnostic supervisor includes a second model of the steering system of the vehicle. Based on the setpoint value and the second model, the second diagnostic supervisor can calculate a second virtual value of the control attribute; and based on the second virtual value of the control attribute and the measured value of the control attribute, the second diagnostic supervisor can determine a second operating condition of the steering system of the vehicle.

In accordance with yet another aspect of the present invention, the second model of the steering system can include the transfer function and the second diagnostic supervisor may execute on a second controller different than the first controller.

Another aspect of the present invention relates to a vehicle control system including a first controller that includes an input configured to receive a steering control input to control a steered wheel of a vehicle, and a memory for storing code executable by the first controller. The executable code includes a steering application configured to, based on the steering control input, determine a setpoint value of a control attribute related to the steered wheel. The executable code also includes a first diagnostic supervisor configured to receive a) a measured value of the control attribute, from a steering control module, and b) the setpoint value of the control attribute, from the steering application; wherein the first diagnostic supervisor comprises a first model of a steering system of the vehicle. The first diagnostic supervisor is also configured to a) calculate, based on the setpoint value and the first model, a first virtual value of the control attribute, and b) determine, based on the first virtual value of the control attribute and the measured value of the control attribute, a first operating condition of the steering system of the vehicle.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
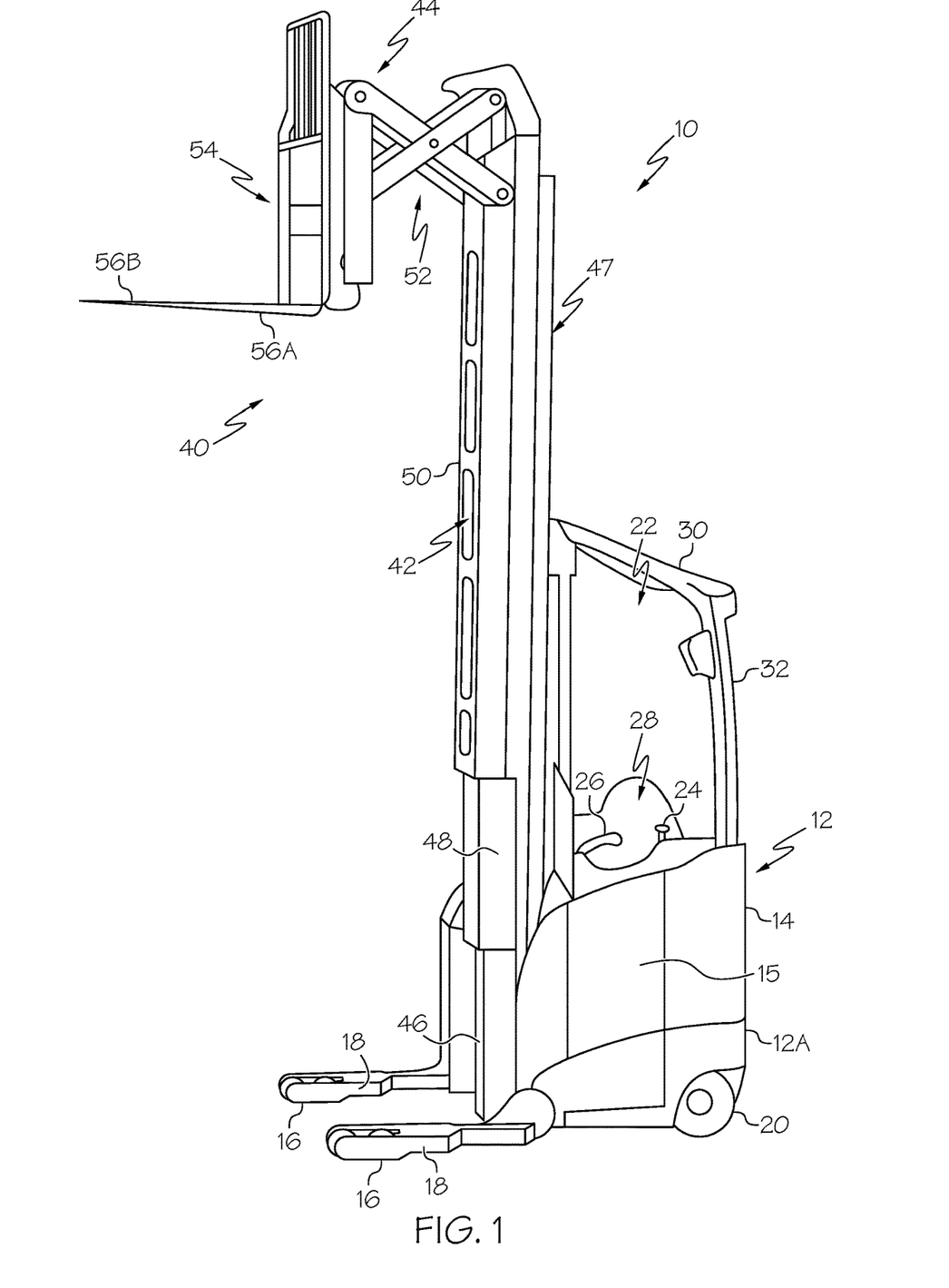
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

Figure 2A:
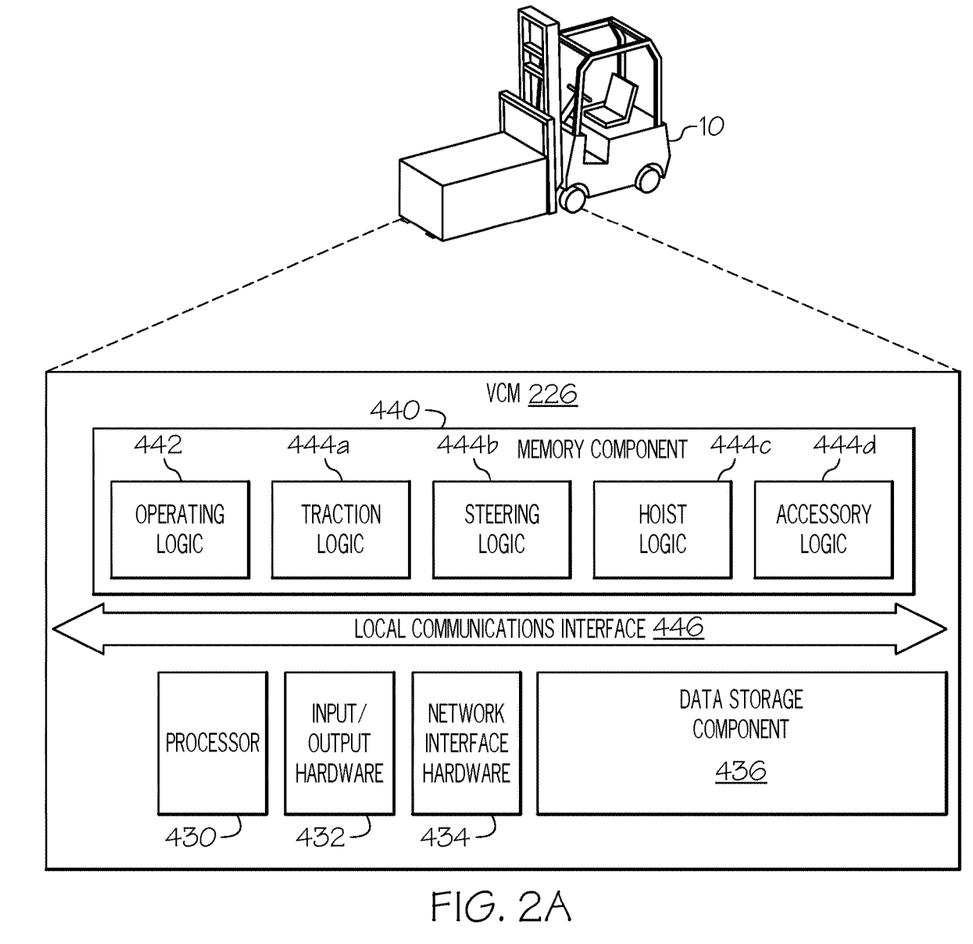
FIG. 2A depicts a computing environment for providing control logic in a vehicle control module (VCM) of the vehicle of FIG. 1.

FIG. 2A depicts a computing environment for providing control logic in a vehicle control module (VCM) 226, according to one or more embodiments shown and described herein. The vehicle control module 226 and the way it interfaces with various operator controls and other functional systems of the vehicle 10 may be similar to control structure disclosed in U.S. Patent Publication Nos. 2010/0228428 and 2014/0188324, the disclosures of which are incorporated herein by reference in their entireties.

In the illustrated embodiment, the VCM 226 includes one or more processors or microcontrollers 430, input/output hardware 432, network interface hardware 434, a data storage component 436, and a memory component 440. The one or more processors, controllers or microcontrollers 430 may include any processing component operable to receive and execute instructions (such as from the data storage component 436 and/or the memory component 440). The processors, controllers or microcontrollers 430 may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" or "controller" is also intended to encompass a combination of two or more of the above recited devices, e.g., two or more microcontrollers.

The data storage component 436 and the memory component 440 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shutdown and restarted may beneficially be stored in non-volatile memory. Also, depending on the particular embodiment, the non-transitory computer-readable medium, mentioned above, may reside within the VCM 226 and/or external to the VCM 226.

Additionally, the memory component 440 may store software or applications that can be executed by the one or more processors or microcontrollers 430. Thus the memory component 440 may store an operating application or logic 442, a traction application or logic 444a, a steering application or logic 444b, a hoist application or logic 444c, and an accessory application or logic 444d. The operating logic 442 may include an operating system and other software such as, for example, diagnostic-related applications for managing components of the VCM 226. The traction application 444a may be configured with one or more algorithms and parameters for facilitating optimal traction control for the vehicle 10. The steering application 444b may be configured with one or more algorithms and parameters for facilitating optimal steering control of the vehicle 10. The hoist application 444c may include one or more algorithms and parameters for facilitating optimal hoist control of the vehicle 10, which acts as the primary load handling assembly control system used to raise and lower the moveable assembly 47 of the vehicle 10. Additionally, the accessory application 444d may include one or more algorithms and parameters for providing control of accessories of the vehicle 10 such as an auxiliary load handling assembly system, which performs additional tasks such as fork carriage reach, tilt and sideshift of the carriage assembly 44. A local communication interface 446 is also included in FIG. 2A and may be implemented as a bus or other communication interface to facilitate communication among the components of the VCM 226.

The one or more processors or microcontrollers 430 may include any processing component operable to receive and execute instructions (such as from the data storage component 436 and/or the memory component 440). The input/output hardware 432 may include and/or be configured to interface with various operator command and motion feedback sensors. The network interface hardware 434 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 226 and other computing devices including other components coupled with a CAN bus or similar network on the vehicle 10.

It should be understood that the components illustrated in FIG. 2A are merely exemplary and are not intended to limit the scope of this disclosure. While the components in FIG. 2A are illustrated as residing within the VCM 226, this is merely an example. In some embodiments, one or more of the components may reside external to the VCM 226. It should also be understood that while the VCM 226 in FIG. 2A is illustrated as a single device, this is also merely an example. In some embodiments, the traction application or logic 444a, the steering application or logic 444b, the hoist application or logic 444c, and/or the accessory application or logic 444d may reside on different devices. Additionally, while the VCM 226 is illustrated with the traction application or logic 444a, the steering application or logic 444b, the hoist application or logic 444c, and the accessory application or logic 444d as separate logical components, this is also an example. In some embodiments, a single, composite software application may cause the VCM 226 to provide the described functionality.

It also should be understood that the VCM 226 may communicate with various sensors and other control circuitry of the vehicle 10 to coordinate the various conditions of manual operation and automatic operation of the vehicle 10.

Figure 2B:
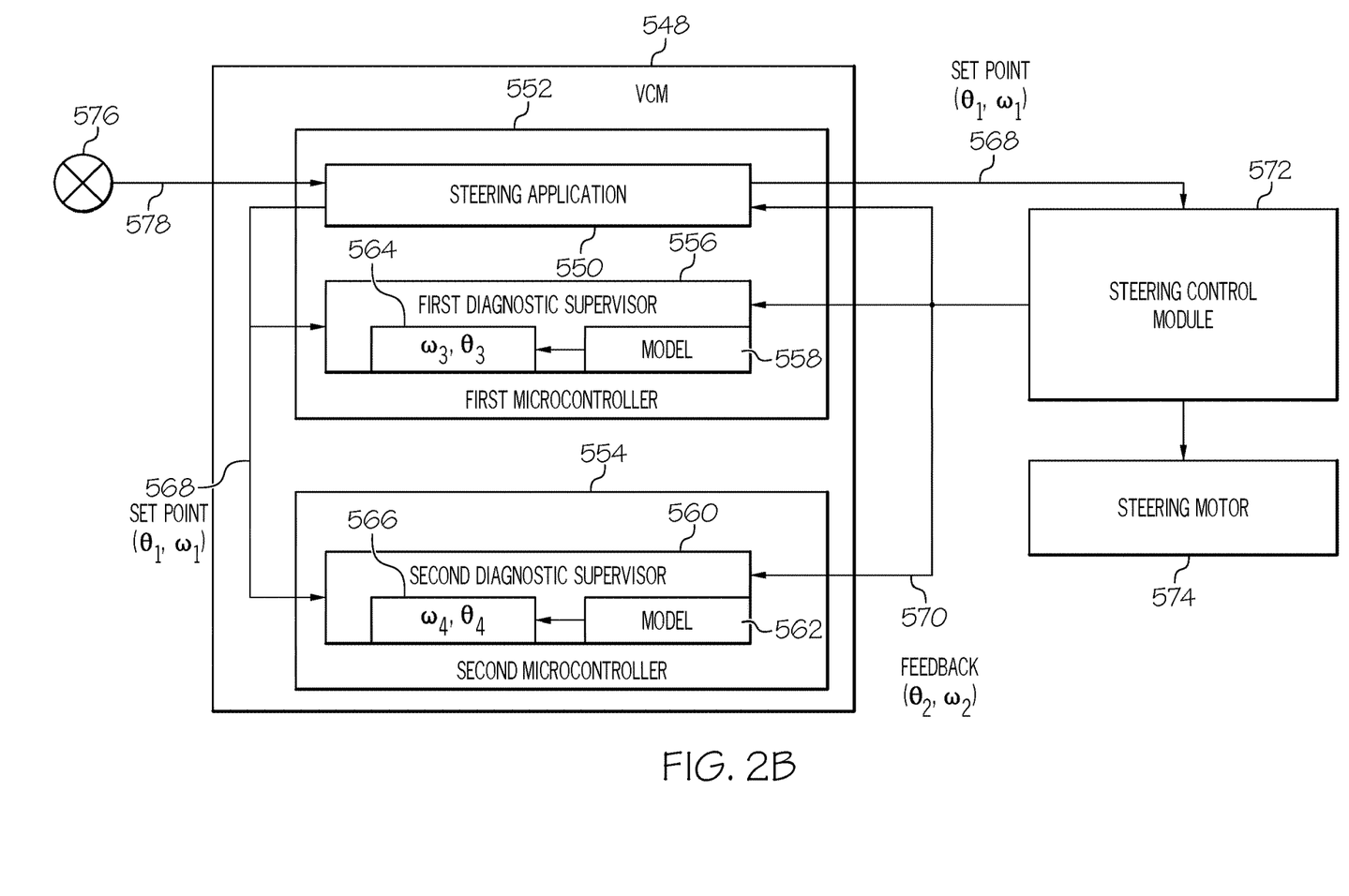
FIG. 2B schematically illustrates selected features of a vehicle and an example vehicle control module that are helpful in describing model-based diagnostic techniques that utilize a steering model in accordance with the principles of the present invention.

FIG. 2B schematically illustrates selected features of a vehicle 10 and an example vehicle control module that are helpful in describing model-based diagnostic techniques that utilize a steering model. The other features of the vehicle 10 and the VCM 226 described with respect to FIG. 1 and FIG. 2A are omitted from FIG. 2B so as not to obscure aspects of the example model-based diagnostics described herein.

In FIG. 2B, an operator-controlled steering control input sensor 576 forming part of a steering device comprising the tiller knob 24 of the vehicle 10 set out in FIG. 1, provides a steering control input or steering control input signal 578 (e.g., an analog voltage) to a vehicle control module (VCM) 548. The steering control input sensor 576 may also form part of another steering device comprising a steering wheel, a control handle, a steering tiller or like steering element. The steering control input or steering control input signal 578 may be adjusted or otherwise conditioned and may, for example, be provided to an input pin of a first microcontroller 552 within the VCM 548. That signal may be further conditioned and supplied as an input value to a steering application 550 that is being executed by the first microcontroller 552. The voltage, for example, of the steering control input signal 578, or the rate of change of that voltage, can vary based on the position and the rate of change of position of the steering control input sensor 576 associated with the steering device, i.e., the tiller knob 24 in the illustrated embodiment. Based on the input signal the steering application 550 receives that corresponds to the steering control input signal 578, the steering application 550 determines a setpoint 568 for a control attribute related to the steered wheel 20 of the vehicle 10. The control attribute may, for example, be a steered wheel angle or an angular velocity of a steering motor 574 and, therefore, a value of the setpoint 568 may be a steered wheel angle $\theta_1$ or a steering motor angular velocity $\omega_1$. For example, an input signal having a voltage value can be used along with a lookup table to correlate the voltage value to a particular wheel angle value for the steering setpoint or the rate of change of the voltage of the input signal could be multiplied by a predetermined scaling factor to convert that rate of change into the setpoint that changes the steering wheel angular velocity. The setpoint 568 can be provided to a steering control module (SCM) 572. The SCM 572 uses the setpoint 568 for controlling the steering motor 574 which positions the steered wheel 20 to conform to a desired position as indicated by the operator's manipulation of the steering control input sensor 576. The SCM 572 also provides a feedback value 570 of the control attribute related to the steered wheel. In particular, the feedback value is a measured, or actual, steered wheel angle $\theta_1$ of the steered wheel 20 or is a measured, or actual, angular velocity $\omega_2$ of the steering motor 574. The SCM 572 provides the feedback value 570 to the steering application 550.

During routine operation of the vehicle, a first diagnostic supervisor 556 is also executed by the first microcontroller 552 and receives the setpoint value 568 from the steering application 550 and also receives the feedback value 570 from the steering control module 572. In particular, the first diagnostic supervisor 556 includes a model 558 that is used to calculate a first virtual value 564 of the control attribute related to the steered wheel 20. Similar to the setpoint 568, the first virtual value 564 may, for example, be a steered wheel angle or a steering motor angular velocity and, therefore, a value of the first virtual value may be an angle $\theta_3$ or an angular velocity $\omega_3$. The model 558 can be a model of an isolated steering system of the vehicle. In particular, the model 558 can model just a) the steering control module 572, b) the steering motor 574, and c) a load that represents a reactive force of the wheel 20 of the vehicle whose position is being changed by the steering motor 574. While one example type of model is described in more detail below, the model 558 can be of any type that simulates the behavior of the isolated steering system such that the model provides a predicted result of how the control attribute of the steering system should react, i.e., what its angle or angular velocity should equal, if the steering control module 572 is provided with a particular setpoint 568 and the steering system is operating properly.

The first diagnostic supervisor 556 executes so as to provide the model 558 with the setpoint value 568 as an input in order to generate, or calculate, the first virtual value 564 as an output. Assuming that the model 558 accurately reflects the behavior of the isolated steering system, the first virtual value 564 should closely reflect the actual steered wheel angle or the actual angular velocity of the steering motor which is a result of the setpoint 568 being provided to the steering control module 572 of the presently operated vehicle.

Accordingly, the first diagnostic supervisor 556 can compare the feedback value 570 with the first virtual value 564. As mentioned, the model 558 is essentially a virtual steering system that produces a simulated response (i.e., the first virtual value 564) of the vehicle's steering system. The first virtual value 564 can be compared to the measured, or feedback, value 570 for verification of proper operation of the vehicle's steering system. If the comparison indicates that the two values differ by more than a predetermined threshold, then the first diagnostic supervisor 556 can generate a fault signal, indicating a fault condition is occurring. The VCM 548 can, in response to the fault signal, stop movement of the vehicle.

The VCM 548 of FIG. 2B can, for example, include a second, or redundant, microcontroller 554 which executes a second diagnostic supervisor 560 that operates substantially similar to the first diagnostic supervisor 556. Thus during routine operation of the vehicle, the second diagnostic supervisor 560 is executed by the second microcontroller 554 and receives the setpoint value 568 from the steering application 550 and also receives the feedback value 570 from the steering control module 572. In particular, the second diagnostic supervisor 560 includes a model 562 that is used to calculate a second virtual value 566 of the control attribute related to the steered wheel 20. Similar to the setpoint 568, the second virtual value 566 may, for example, be a steered wheel angle or a steering motor angular velocity and, therefore, a value of the second virtual value 566 may be an angle $\theta_4$ or an angular velocity $\omega_4$. Similar to the model 558, the model 562 can be a model of an isolated steering system of the vehicle. The second diagnostic supervisor 560 executes so as to provide the model 562 with the setpoint value 568 as an input in order to generate, or calculate, the second virtual value 566 as an output. Assuming that the model 562 accurately reflects the behavior of the isolated steering system, the second virtual value 566 should reflect the actual steered wheel angle or the actual angular velocity of the steering motor which is a result of the setpoint 568 being provided to the steering control module 572 of the presently operated vehicle.

Accordingly, the second diagnostic supervisor 560 can compare the feedback value 570 with the second virtual value 566. The second virtual value 566 can be compared to the measured value 570, for example, to provide verification of proper operation of the vehicle's steering system. If the comparison indicates that the two values differ by more than a predetermined threshold, then the second diagnostic supervisor 560 can generate its own fault signal separate from that generated by the first diagnostic supervisor 556, indicating a fault condition is occurring. The VCM 548 can, in response to the fault signal from the second diagnostic supervisor 560, stop movement of the vehicle.

Because of the way microcontrollers and other digital hardware of the vehicle handle signals and values of signals, the feedback value 570, for example, can be an array of values that results from a continuous signal being sampled at a periodic rate (e.g., every 10 ms). Similarly, the model 558 can be provided with the setpoint 568 every 10 ms so that a new first virtual value 564 is calculated every 10 ms. While it would be possible to compare each individual feedback value 570 with a single, corresponding first virtual value 564, that comparison may not accurately reveal whether or not the steering system of the vehicle is malfunctioning. However, comparing the last predefined number, e.g., 100, feedback values 570 with the predefined number, e.g., 100, of most recently generated first virtual values 564 would likely provide a much more accurate indication of whether or not the vehicle's steering system is malfunctioning. Thus, the first virtual value 564 can comprise a first array of individually valued elements and the measured value 570 can comprise a second array of corresponding individually valued elements so that the similarity between the measured value 570 and the first virtual value 564 is determined based on a computed correlation between the first array and the second array.

In general, the more samples of feedback values 570 and the more calculations of first virtual values 564 that are used for a comparison to one another, the more accurate of a result will be produced. However, accumulating more samples of these values reflect a longer time period which might allow a malfunction to occur for an extended period of time before that condition is detected. Accordingly, there is typically some operational upper limit to the amount of time used to collect values before a comparison is made between the feedback value 570 and the first virtual value 564. For example, there may be operational constraints that require detection and/or mitigating action be initiated within, for example, 100 ms of a malfunction occurring. Or for instance, there may be a maximum allowable deviation between the setpoint 568 and the actual position to keep the system under proper control which would accumulate faster or slower based on the travel speed of the vehicle and hence decrease or increase the diagnostic evaluation time.

If the sample period of the feedback value 570 is 10 ms, then 10 samples can be collected and used for the comparison between the feedback value 570 and the first virtual value 564 using a 10 ms response time. The 10 samples of the feedback value 570 can be considered a first random variable, X, comprising an array of 10 actual responses (e.g., $x_1$-$x_{10}$) to 10 input values (i.e., set point values 570) and the first virtual value 564 can be considered a second random variable, Y, comprising 10 simulated model responses (e.g., $y_1$-$y_{10}$) to those same 10 input values. One measure of similarity of two random variables is known as a correlation coefficient, P. The correlation coefficient of two variables, sometimes simply called their correlation, is the covariance of the two variables divided by the product of their individual standard deviations. It is a normalized measurement of how the two variables are linearly related. However, one of ordinary skill will recognize that there are many other techniques for measuring similarity between two arrays of values.

Using well understood techniques, the respective average, $\bar{X}$, $\bar{Y}$, of the variables X, Y can be computed and then each respective variance $\sigma_x^2$, $\sigma_y^2$ can be computed as well. The square root of the variances provide a respective standard deviation $\sigma_x$, $\sigma_y$ for each variable. The covariance $C_{xy}$ of the two variable can be also be calculated according to:

$$C_{xy} = \tfrac{1}{10}(\Sigma_{i=1}^{10}((x_i - \bar{X})(y_i - \bar{Y})))$$

which allows the correlation coefficient to be calculated according to:

$$P = \frac{C_{xy}}{\sigma_x \sigma_y}.$$

When two variables or signals exactly correlate P=1 and for exactly uncorrelated signals, P=0. Thus, a predetermined threshold value can be identified which is used to determine that when the P value is below that threshold, the feedback value 570 and the first virtual value 564 are not similar to one another. In the example where 10 samples are used to calculate P, then a value for P of around 0.5 to around 0.8 likely indicates that the feedback value 570 and the first virtual value 564 are similar enough that a steering system malfunction is unlikely. If a P value is calculated below 0.5, then a malfunction of the steering system of the vehicle is likely occurring. Because of unexpected noise or other anomalies, the occurrence of a single P value below that threshold may occasionally occur even in the absence of a malfunction. Thus, the first diagnostic supervisor 556 may increment a counter each time a P value is calculated below the predetermined threshold and decrement the counter each time a P value is calculated above the predetermined threshold. If the value of that counter ever reaches a maximum allowable number (e.g., 5), then the first diagnostic supervisor can alert the VCM 548 that a fault condition has occurred.

Independent of the first diagnostic supervisor 556, the second diagnostic supervisor 560 can also calculate how similar a second virtual value 566 is to the feedback value 570. While the second diagnostic supervisor 560 could employ a different model 562, a different sampling period, or a different similarity measurement technique, the second diagnostic supervisor 560 may also be configured substantially similar to the first diagnostic supervisor 556 so that it operates in almost an identical way. Thus, the model 562 and the model 558 may both be the same model and a similar correlation coefficient and counter can be used by the second diagnostic supervisor 560 to generate its own diagnostic signal alerting the VCM 548 of a fault condition of the vehicle's steering system.

One example operational constraint was described above that limited the collection of 10 samples over a 100 ms period. Another possible operational constraint could be based on a speed of the vehicle and an acceptable or allowable tolerance in a positional error of the vehicle. If the measured angle $\theta_2$ of the steered wheel 20 does not exactly match the setpoint 568 (e.g., angle $\theta_1$), then the amount of that difference in conjunction with the speed of the vehicle results in the vehicle arriving at a position different than where it was being steered by the operator. Further, the longer the vehicle is allowed to travel, the greater that positional error will become. If a positional error threshold or tolerance is identified (which may be different for different vehicles), this threshold could also impose an operational constraint on how many samples are collected in order to calculate a correlation coefficient P. Accordingly, a current speed of the truck and a current steer angle error can be used to calculate how long of a period of time it will take before the positional error of the truck exceeds the allowable positional error. This period of time, if less than 100 ms (e.g., 70 ms), may limit the number of samples to less than 10 (e.g., 7) that will be used by the first diagnostic supervisor 556 to determine if a fault condition exists in the vehicle's steering system. When fewer samples are used, a lower predetermined threshold for comparison to the P correlation coefficient may be used. Thus, when only 7 samples are available to calculate P, the allowable threshold may be between about 0.4 and 0.6.

Figure 3A:
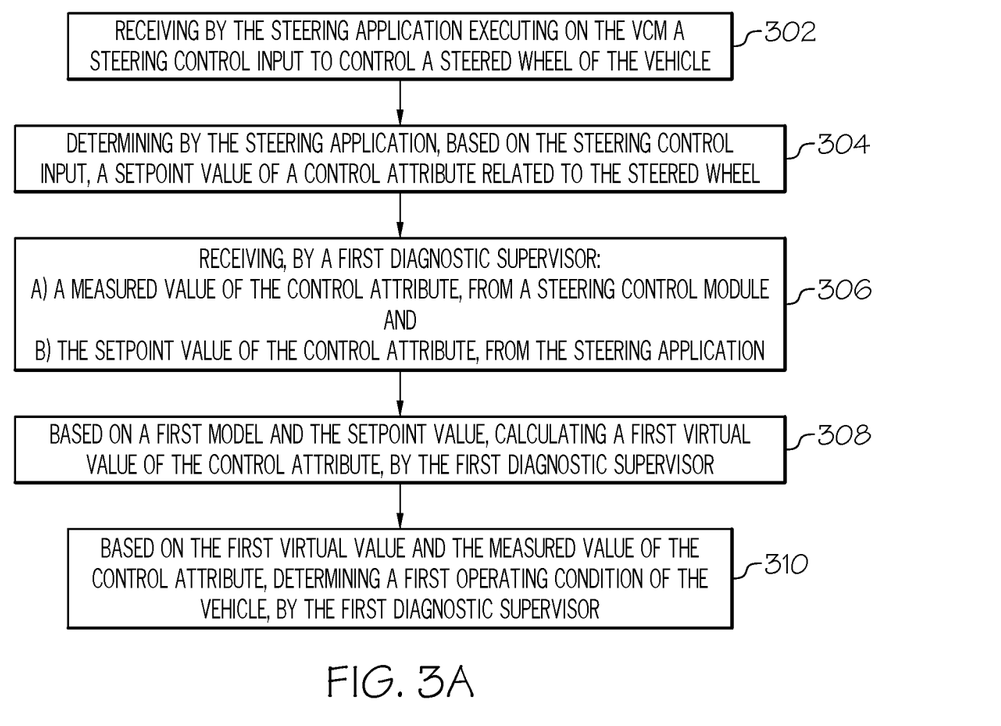
FIG. 3A is a flowchart of an example method for implementing model based diagnostics using a steering model, in accordance with the principles of the present invention.

FIG. 3A is a flowchart of an example method for implementing model based diagnostics using a steering model, in accordance with the principles of the present invention. In particular, a steered wheel of a vehicle is controlled by a VCM and a SCM to affect a desired direction of travel of the vehicle. The example method begins in step 302 with a steering application executing on the VCM, receiving a steering control input to control the steered wheel of the vehicle. Then, in step 304, the steering application determines a setpoint value of a control attribute related to the steered wheel based on the received steering control input. This control attribute can, for example, be an angular velocity of a steering motor coupled with the steered wheel of the vehicle or can be a steered wheel angle.

A first diagnostic supervisor, also executing on the VCM, receives in step 306 two different values. The first diagnostic supervisor receives a measured value, or a feedback value, of the control attribute. This feedback value can, for example, be provided by the SCM of the vehicle. The first diagnostic supervisor also receives the setpoint value of the control attribute, from the steering application. In particular, the first diagnostic supervisor includes a first model of a steering system of the vehicle that can be used in conjunction with these two received values.

Thus, in step 308, based on the setpoint value and the first model, the first diagnostic supervisor calculates a first virtual value of the control attribute. The setpoint value is the input to the model and the first virtual value is the output of the model. In step 310, the first virtual value and the measured value of the control attribute are used by the first diagnostic supervisor to determine a first operating condition of the steering system of the vehicle, i.e., a fault or a no fault condition. If these two values are considered to be substantially different than one another, a malfunction of the vehicle's steering system may be occurring. Thus, the method of FIG. 3A can include comparing the first virtual value of the controlled attribute with the measured value to determine an indicator that represents a degree of similarity between the first virtual value and the measured value. The indicator can then be compared to a predetermined threshold value to determine whether or not the steering system first operating condition is in a fault condition. If a fault condition is detected then the VCM or some other component of the vehicle can stop movement of the vehicle.

Figure 3B:
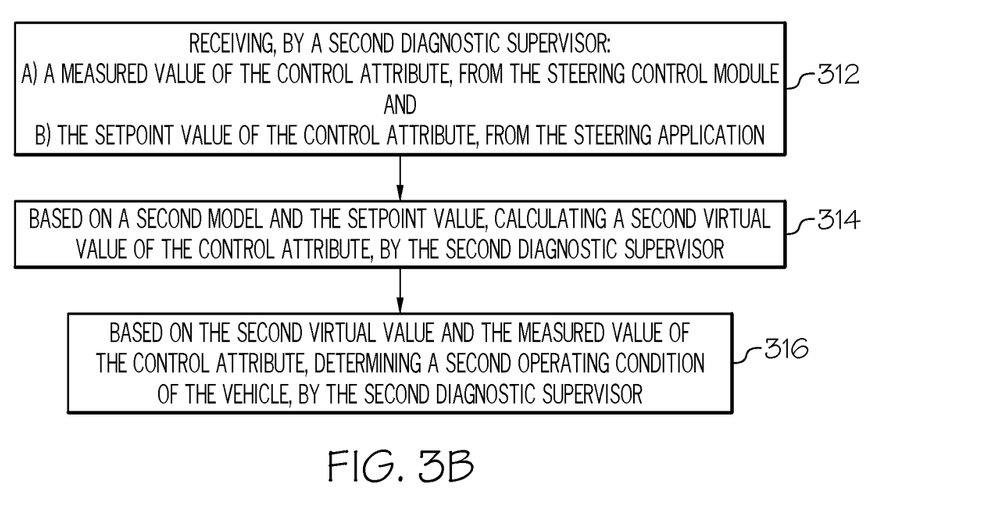
FIG. 3B is a flowchart of another example method for implementing model based diagnostic using a steering model, in accordance with the principles of the present invention.

As described above, the steering application and the first diagnostic supervisor can execute on a first microcontroller while a second diagnostic supervisor can execute on a second microcontroller. FIG. 3B is a flowchart of another example method for implementing model based diagnostic using a second steering model of a second diagnostics supervisor executing on a second microcontroller.

According to the method of FIG. 3B, in step 312, the second diagnostic supervisor receives a) the measured value of the control attribute, from the steering control module, and b) the setpoint value of the control attribute, from the steering application, wherein the second diagnostic supervisor includes a second model of the steering system of the vehicle. In step 314, based on the setpoint value and the second model, the second diagnostic supervisor calculates a second virtual value of the control attribute; and based on the second virtual value and the measured value, the second diagnostic supervisor determines, in step 316, a second operating condition of the steering system of the vehicle, i.e., a fault or a no fault condition. Thus, the method of FIG. 3B can include comparing the second virtual value of the controlled attribute with the measured value to determine an indicator that represents a degree of similarity between the second virtual value and the measured value. The indicator can then be compared to a predetermined threshold value to determine whether or not the steering system second operating condition is in a fault condition. If a fault condition is detected then the VCM or some other component of the vehicle can stop movement of the vehicle.

In the method of FIG. 3B, the second model of the steering system may be the same as the first model used by the first diagnostics supervisor, or it may be a different model.

As mentioned above, there are various ways to model or simulate systems similar to the isolated steering system of the vehicle described above. Any of these known modeling techniques may be used without departing from the scope of the present invention. However, one example type of model that can be used for either the model 558 or 562 is a transfer function model calculated based on observed responses of an actual isolated steering system to a plurality of different operating conditions.

Generally, a transfer function (and analogous terms "system function" and "network function") refers to a mathematical representation to describe a relationship between the inputs and outputs of a system. In particular, the relationship is described using a ratio of polynomials where the roots of the denominator polynomial are referred to as the system poles and the roots of the numerator polynomial are referred to as the system zeros.

Figure 4:
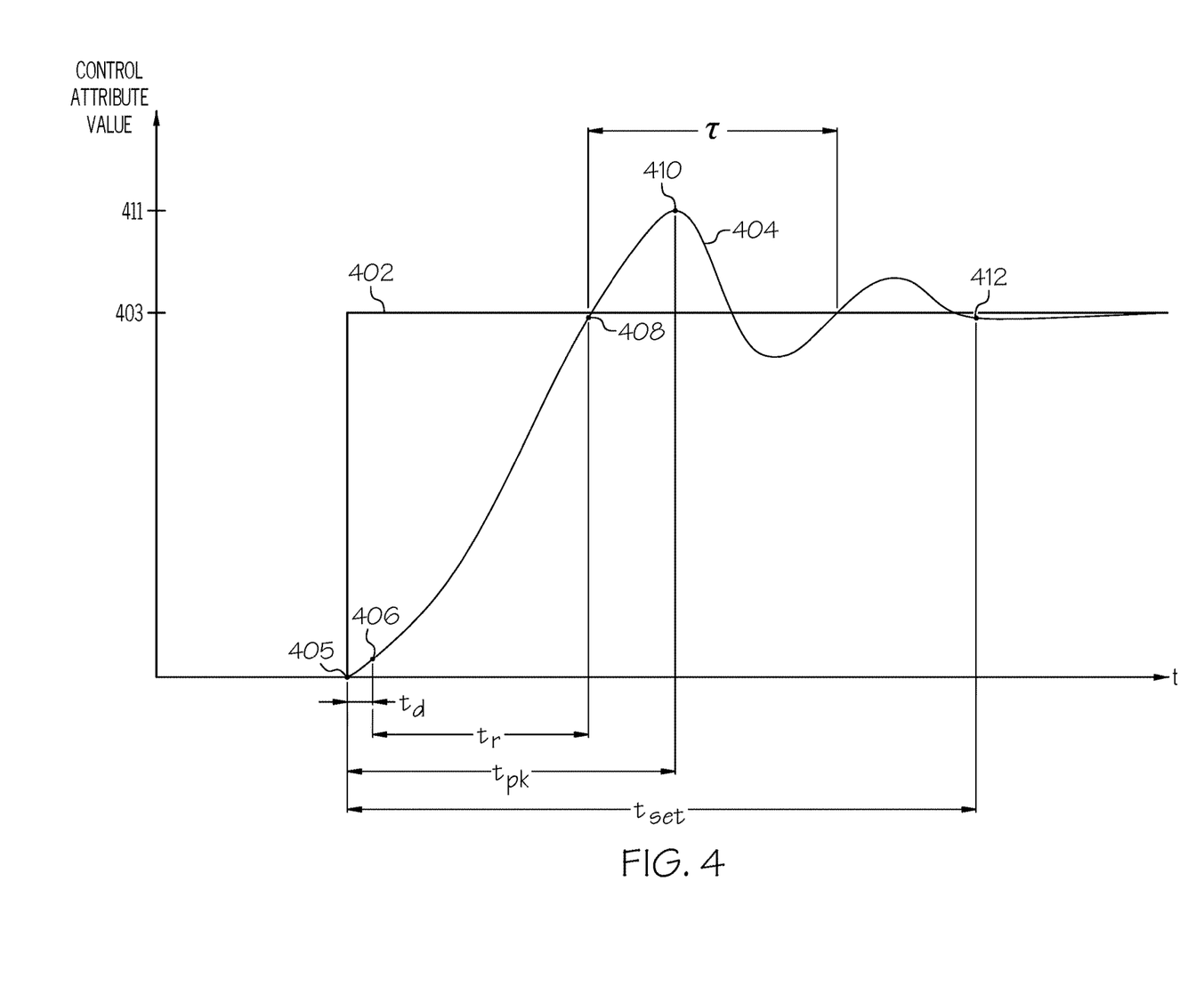
FIG. 4 graphically depicts an example of how a vehicle steering system can react to a step input.

A transfer function for a system can be developed by providing the system with well-defined input values and collecting the resulting output values. For example, an isolated vehicle steering system as described above that includes a controller, a steering motor, and a load on that motor can be provided with input values and then observed in order to measure the resulting output. FIG. 4 graphically depicts an example of how a vehicle steering system can react to a step input.

In FIG. 4, the y-axis represents both an input value for a control attribute related to the vehicle steered wheel and an output value of that control attribute which results. The x-axis represents time. The step input 402 can, for example, reflect the vehicle steering system receiving an operator input, at time 405, that corresponds to a desired steered wheel angle 403. The output signal 404 reflects an actual response of the isolated steering system components to the input 402.

The output signal 404 can include a number of characteristic attributes. The point 406 corresponds to when the output signal 404 first shows a response to the step input 402; the point 408 corresponds to when the output signal 404 reaches the value 403; the point 410 corresponds to the peak value of the output signal 404; and the point 412 corresponds to when the output signal 404 settles (i.e., reaches steady state) at the value 403. These different points help define a delay time $t_d$ between points 405 and 406, a peak time $t_{pk}$ between points 405 and 410, a settling time $t_{set}$ between points 405 and 412, and a rise time $t_r$ between points 406 and 408. The output signal 404 also includes an overshoot value related to the steady state value 403 and the peak value 411. The output signal's overshoot is typically referred to as "percentage overshoot" and calculated according to:

$$\% \text{ overshoot} = \frac{\text{peak value} - \text{steady state value}}{\text{steady state value}}.$$

The oscillating portion of the output signal 404 before it settles to its steady state value includes an oscillating period τ that defines a natural frequency $f_n$ (i.e., 1/τ) which, in terms of radians, is $\omega_n = 2\pi f_n$. Also, a damping coefficient ζ can be calculated according to:

$$\zeta = \frac{4}{t_{set} \omega_n}$$

The input signal 402 can be considered a time-based continuous signal x(t) and the output signal 404 can also be considered a time-based signal u(t) such that the Laplace transform of each signal is X(s) and U(s). The transfer function, H(s) for the isolated steering system is therefore generically defined as U(s)=H(s)X(s). More specifically, a system that produces the output signal 404 of FIG. 4 based on receiving the step input signal 402 can be represented by a second order transfer function H(s) according to:

$$H(s) = \frac{\omega_n^2}{s^2 + 2\zeta\omega_n s + \omega_n^2}$$

As described above, however, the microcontrollers and diagnostic supervisors operate with discrete time-sampled values and not with continuous signals. Thus, the transfer function H(s) can be transformed into a discrete transfer function H(z) by a variety of different methods. One method, known as a bilinear transform transforms H(s) to H(z) by making the substitution of:

$$s = \left(\frac{z-1}{z+1}\right)\left(\frac{z}{t_s}\right)$$

where
$t_s$ is the sampling time (e.g., 10 ms) used to measure values of the input and output signals.

There are, however, automated methods for calculating a discrete transfer function that are available as alternatives to the methods just described. For example, MATLAB includes a function "c2d" that automates this process. If, for example, the input signal 402 and the output signal 404 reveal an initial transfer function of:

$$H(s) = \frac{10}{s^2 + 3s + 10}$$

then the commands:
h=tf(10, [1 3 10]);
hd=c2d(h, 0.01)
will first define the continuous transfer function "h" and transform it to a discrete transform function "hd" using a sampling time of "0.01" seconds. The MATLAB command "hd=" will print out the discrete transform function as:

$$H(z) = \frac{0.01187z^2 + 0.06408z + 0.009721}{z^2 - 1.655Z + 0.7408}$$

This transfer function H(z) can be used by the first and second diagnostic supervisors to produce virtual values for the control attribute related to the steered wheel of the vehicle. In particular, when a setpoint value is received by a diagnostic supervisor it is transformed by the transfer function H(z) to a virtual value. Thus, a stream of discrete samples of the setpoint value produces a corresponding stream of virtual values. These virtual values can then be compared with the feedback values to determine an operating condition of the steering system of the vehicle.

In particular, if "k" is used as an index to refer to a particular sample x[k] in the stream of discrete samples of the setpoint value, then a corresponding first virtual value y[k] can be calculated according to the above transfer function using:

$$y[k] = \frac{(ax[k] + bx[k-1] + cx[k-2] - ey[k-1] - fy[k-2])}{d}$$

where, for this particular example transfer function:
a=0.01187,
b=0.06408,
c=0.009721,
d=1,
e=−1.655, and
f=0.7408.

MATLAB also provides tools to fine-tune this initial transfer function H(z). For example, the transfer function H(z) can be modeled in SIMULINK which includes an OPTIMIZATION TOOLBOX. The OPTIMIZATION TOOLBOX includes a tool for model parameter estimation. In the example transfer function H(z) above, the numerator coefficients are [0.01187 0.06408 0.009721] and the denominator coefficients are [1 −1.655 0.7408]. The parameter estimation function of the OPTIMIZATION TOOLBOX can be provided with a set of input data, a set of output data and the transfer function. For example, the parameter estimation tool can be provided with data representing the input signal 402, the output signal 404 and the transfer function H(z). The parameter estimation function will use the input data and the transfer function H(z) to calculate a simulated set of output data. Based on a comparison between the actual output signal 404 and the simulated output data, the parameter estimation function will fine-tune the numerator and denominator coefficients to more closely match the simulated data to the actual output data signal 404.

To further refine the transfer function H(z), other actual input and output data can be provided to the parameter estimation function of the SIMULINK OPTIMIZATION TOOLBOX. For example, a sinusoidal input and its resulting output can be provided and a ramp input and its resulting output can be provided. As a result, a transfer function H(z) can be developed that is calculated based on observed responses of a vehicle steering system to a plurality of different operating conditions.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
receiving, by a steering application executing on a vehicle control module, a steering control input to control a steered wheel of a vehicle;
based on the steering control input, determining, by the steering application, a setpoint value of a control attribute related to the steered wheel;
receiving, by a first diagnostic supervisor:
a measured value of the control attribute, from a steering control module, and
the setpoint value of the control attribute, from the steering application;
wherein the first diagnostic supervisor comprises a first model of a steering system of the vehicle;
based on the setpoint value and the first model, calculating, by the first diagnostic supervisor a first simulated virtual value of the control attribute; and
based on the first simulated virtual value of the control attribute and the measured value of the control attribute, determining, by the first diagnostic supervisor, a first operating condition of the steering system of the vehicle.

2. The method of claim 1, wherein the control attribute comprises a steered wheel angle.

3. The method of claim 1, wherein the control attribute comprises an angular velocity of a steering motor coupled with the steered wheel of the vehicle.

4. The method of claim 1, wherein determining the first operating condition of the steering system, comprises:
comparing the first virtual value of the controlled attribute with the measured value to determine an indicator that represents a degree of similarity between the first virtual value and the measured value.

5. The method of claim 4, wherein:
the first virtual value comprises a first array of individually valued elements;
the measured value comprises a second array of individually valued elements; and
the indicator is determined based on a computed correlation between the first array and the second array.

6. The method of claim 5, comprising:
comparing the indicator to a predetermined threshold value; and
based on the comparison, determining whether or not the steering system is in a fault condition.

7. The method of claim 6, comprising:
stopping, by the vehicle control module, movement of the vehicle when the steering system is in the fault condition.

8. The method of claim 1, wherein the first model of the steering system comprises a transfer function calculated based on observed responses of a substantially similar steering system to a plurality of different operating conditions.

9. The method of claim 1, comprising:
communicating, by the steering application, the setpoint value to the steering control module; wherein the steering control module controls a steering motor coupled with the steered wheel based on the setpoint value.

10. The method of claim 1, wherein the steering application and the first diagnostic supervisor execute on a first controller.

11. The method of claim 10, comprising:
receiving, by a second diagnostic supervisor:
the measured value of the control attribute, from the steering control module, and
the setpoint value of the control attribute, from the steering application;
wherein the second diagnostic supervisor comprises a second model of the steering system of the vehicle;
based on the setpoint value and the second model, calculating, by the second diagnostic supervisor a second virtual value of the control attribute; and
based on the second virtual value of the control attribute and the measured value of the control attribute, determining, by the second diagnostic supervisor, a second operating condition of the steering system of the vehicle.

12. The method of claim 11, wherein the second model of the steering system comprises the transfer function.

13. The method of claim 11, wherein the second diagnostic supervisor executes on a second controller different than the first controller.

14. A vehicle control system comprising:
a) a first controller comprising:
   i) an input configured to receive a steering control input to control a steered wheel of a vehicle, and
   ii) a memory for storing code executable by the first controller;
b) the executable code comprising a steering application configured to:
   i) based on the steering control input, determine a setpoint value of a control attribute related to the steered wheel; and
c) the executable code comprising a first diagnostic supervisor configured to:
   i) receive:
      1) a measured value of the control attribute, from a steering control module, and
      2) the setpoint value of the control attribute, from the steering application;
   wherein the first diagnostic supervisor comprises a first model of a steering system of the vehicle;
   ii) calculate, based on the setpoint value and the first model, a first simulated virtual value of the control attribute; and
   iii) determine, based on the first simulated virtual value of the control attribute and the measured value of the control attribute, a first operating condition of the steering system of the vehicle.

15. The system of claim 14, wherein the control attribute comprises a steered wheel angle.

16. The system of claim 14, wherein the control attribute comprises an angular velocity of a steering motor coupled with the steered wheel of the vehicle.

17. The system of claim 14, wherein the first diagnostic supervisor is configured to:
compare the first virtual value of the controlled attribute with the measured value to determine an indicator that represents a degree of similarity between the first virtual value and the measured value.

18. The system of claim 17, wherein:
the first virtual value comprises a first array of individually valued elements;
the measured value comprises a second array of individually valued elements; and
the indicator is determined based on a computed correlation between the first array and the second array.

19. The system of claim 18, wherein the first diagnostic supervisor is configured to:
compare the indicator to a predetermined threshold value; and
based on the comparison, determine whether or not the steering system is in a fault condition.

20. The system of claim 19, wherein movement of the vehicle is stopped when the steering system is in the fault condition.

21. The system of claim 14, wherein the first model of the steering system comprises a transfer function calculated based on observed responses of a substantially similar steering system to a plurality of different operating conditions.

22. The system of claim 14, wherein the steering application is configured to:
communicate the setpoint value to the steering control module; wherein the steering control module controls a steering motor coupled with the steered wheel based on the setpoint value.

23. The system of claim 14, comprising:
a) a second controller comprising:
   i) a second memory for storing code executable by the second controller;
b) the executable code comprising a second diagnostic supervisor configured to:
   i) receive:
      1) the measured value of the control attribute, from the steering control module, and
      2) the setpoint value of the control attribute, from the steering application; wherein the second diagnostic supervisor comprises a second model of the steering system of the vehicle;
   ii) calculate, based on the setpoint value and the second model, a second virtual value of the control attribute; and
   iii) determine, based on the second virtual value of the control attribute and the measured value of the control attribute, a second operating condition of the steering system of the vehicle.

24. The system of claim 23, wherein the second model of the steering system comprises the transfer function.

* * * * *

UNITED STATES PATENT AND TRADEMARK OFFICE
CERTIFICATE OF CORRECTION

PATENT NO. : 11,008,037 B2
APPLICATION NO. : 15/224945
DATED : May 18, 2021
INVENTOR(S) : Stephen T. Mangette et al.

It is certified that error appears in the above-identified patent and that said Letters Patent is hereby corrected as shown below:

In the Specification

Column 3, Line 5, "implementing model based diagnostic using a steering" should read
-- implementing model based diagnostics using a steering --

Signed and Sealed this
Fifth Day of July, 2022

Katherine Kelly Vidal
*Director of the United States Patent and Trademark Office*